United States Patent [19]

Hegarty

[11] 4,254,094

[45] Mar. 3, 1981

[54] PROCESS FOR PRODUCING HYDROGEN FROM SYNTHESIS GAS CONTAINING COS

[75] Inventor: William P. Hegarty, Wescosville, Pa.

[73] Assignee: Air Products and Chemicals, Inc., Allentown, Pa.

[21] Appl. No.: 22,015

[22] Filed: Mar. 19, 1979

[51] Int. Cl.³ ............................ C01B 1/16; C01B 1/26
[52] U.S. Cl. ............................. 423/648 R; 252/373; 423/220; 423/242; 423/650; 423/655
[58] Field of Search .............. 423/648, 650, 655, 656, 423/220, 226, 242 R, 243; 252/373

[56] References Cited

U.S. PATENT DOCUMENTS

| | | | |
|---|---|---|---|
| 3,418,082 | 12/1968 | Ter Haar | 423/655 X |
| 3,823,227 | 7/1974 | White | 423/655 |
| 3,965,244 | 6/1976 | Sykes | 423/243 X |
| 4,052,176 | 10/1977 | Child et al. | 252/373 X |
| 4,169,133 | 9/1979 | Staege | 423/220 X |

*Primary Examiner*—Edward J. Meros
*Attorney, Agent, or Firm*—E. Eugene Innis; James C. Simmons

[57] ABSTRACT

Process for treating synthesis gas to recover a purified essentially sulfur-free hydrogen-rich stream. The novel sequence of operations employed comprises initially removing from the feed gas, such as from a synthesis gas derived from partial oxidation of coal or oil, the bulk of contained $H_2S$ and a substantial part of the contained COS, by physical absorption in a suitable solvent. The gas from the initial absorption is then subjected to water-gas shift reaction over a sulfur-resistant shift catalyst under conditions such that in addition to the conversion of CO to $CO_2$ most of the contained COS hydrolyzed to $H_2S$. The gaseous shift product is then subjected to a second treatment with suitable solvent to remove by physical absorption essentially all of the remaining sulfur, which is then present as $H_2S$. The thus desulfurized gas mixture is then sent to a $CO_2$ absorber, from which a $H_2$-rich gas effluent is withdrawn. The $H_2S$ bearing solvent from the second treatment is used in the initial absorbtion. $H_2S$ is stripped from the initial rich absorption bottoms liquid to recover a Claus gas effluent of high $H_2S$ content, while the stripped liquid bottoms are recycled for further use in the process.

22 Claims, 2 Drawing Figures

4,254,094

PROCESS FOR PRODUCING HYDROGEN FROM SYNTHESIS GAS CONTAINING COS

BACKGROUND OF THE INVENTION

1. Field of the Invention

This invention relates to the production of purified hydrogen-rich gas from a synthesis gas mixture containing CO and acid gas contaminants including $CO_2$, $H_2S$ and COS.

2. Description of the Prior Art

Numerous methods for removal of acid gas from gas mixtures containing the same are well known in the art and in commercial practice. Included among the known processes for acid gas removal from gaseous streams are those employing physical absorption of $CO_2$ and/or $H_2S$ as distinguished from other processes involving chemical reaction. The physical processes are particularly preferred when the feed gas to be treated is available at high pressure and contains relatively large quantities of acid gas constituents and selective separation is desired. Numerous and diverse organic solvents have been suggested or utilized for the desired absorption. Included among the solvents used in known commercial process are methanol, employed in the Rectisol process (U.S. Pat. No. 2,863,527); N-methyl-2-pyrrolidone, used in the Purisol process (U.S. Pat. No. 3,505,784); propylene carbonate, used in the Fluor Solvent process (U.S. Pat. No. 2,926,751); and dimethyl ethers of polyethylene glycol, used in the Selexol process (U.S. Pat. Nos. 2,649,166; 3,362,133). Other proposed solvents include: N-substituted morpholine (U.S. Pat. No. 3,773,896); hexafluoroisopropyl alcohol (U.S. Pat. No. 3,339,342); dimethyl formamide or dimethyl sulfoxide (U.S. Pat. No. 3,676,356); among other solvents suggested as physical absorbents for acid gas are: tri-n-butyl phosphate, methyl cyanoacetate, glutanitrile, trimethylene cyanohydrin, N-formyl morpholine.

In addition to the many different types of absorption solvents heretofore used or proposed for use in desulfurization and $CO_2$ removal from gas mixtures, a variety of differences in operation techniques and process conditions appear in the patented art and published technical literature. The more widely adopted systems, however, in general, follow an operational sequence that may be characterized as conventional hereinbelow described.

In these conventional processes for desulfurization and removal of $CO_2$ from gas mixtures, such as those obtained by partial oxidation of heavy oils or by gasification of coal, the presence of COS in the feed gas poses difficulties in desulfurization when physical solvent absorption systems are employed. In such conventional processes the feed gas is charged to an absorption column wherein it is contacted with the selected physical solvent for absorption of $H_2S$ and COS. The thus desulfurized gas is subjected to a catalytic shift reaction with steam wherein the CO is converted to $CO_2$ and hydrogen is obtained. The resulting gaseous effluent from the shift converter is treated with a selected suitable solvent for absorption of $CO_2$ and the resulting gaseous effluent is sent to a methanation section for hydrogenation of residual CO and $CO_2$, obtaining a hydrogen-rich gas product. The fat liquor from the desulfurizing absorber is stripped of contained $H_2S$ and COS, providing a product gas from which sulfur values may be recovered in a Claus plant and the lean solvent is recycled for reuse in further treatment of feed gas. The fat solvent from the $CO_2$ absorber is flashed to remove a portion of the $CO_2$ therefrom, then stripped of residual $CO_2$ with air or inert gas and the thus stripped liquid is recycled for reuse in the $CO_2$ absorber column.

The utility requirements for the operation of such conventional processes are comparatively costly. In certain of these conventional processes solvent flows required for COS removal in desulfurization results in a dilute Claus gas (typically containing about 11-12 mole % $H_2S$) which is too dilute for processing in conventional Claus plants for recovery of sulfur values. Accordingly, special expensive Claus plants need to be used, which require high purity oxygen instead of air for burning a part of the $H_2S$ to $SO_2$ or a sulfur product recycle oxidation. In addition, such processes require special expensive Claus tail gas units.

Other of these conventional processes for desulfurization of feed gas mixtures, such as those employing methanol as solvent for the sulfur gas, have been designed to produce a Claus gas of sufficiently high $H_2S$ content that can be charged to a conventional Claus gas system. These systems, however, need to make use of an extra column to concentrate the $H_2S$. Other conventional processes for desulfurization of gas mixtures obtain a Claus feed containing from about 20% to over 50% $H_2S$. The solvents generally employed in such processes, such as, for example, methanol, N-methyl pyrrolidone or dialkyl ethers of polyethylene glycol, are such that the solubility of $H_2S$ therein is much greater than that of $CO_2$, while the solubility of COS is intermediate of these. When COS is absent the desulfurization solvent flow rate is set for essentially complete $H_2S$ removal and only a small fraction of the $CO_2$ is coabsorbed, so that the desired concentration Claus feed is obtained. When COS is present, however, a substantially higher solvent flow rate is required to obtain complete absorption and desulfurization, with consequent increase in equipment costs and utility requirements. The coabsorption of $CO_2$ is also increased by the higher solvent flow rate and deep flashing of the rich solvent must be utilized to obtain a satisfactory Claus feed containing a required minimum of about 20% $H_2S$. In addition to the foregoing drawbacks, the increased compression requirements for the flash gas further adds substantially higher capital investment in equipment and higher power costs.

The hereinabove described difficulties and other drawbacks of these earlier known processes for desulfurization of gas mixtures are largely avoided in accordance with the novel process of the present invention and the economics of the operation are favorably improved, as will hereinafter appear.

SUMMARY OF THE INVENTION

In accordance with the present invention, a sulfur containing gas mixture such as that obtained by partial oxidation of heavy mineral oils or by gasification of coal, is subjected to two separate stages of desulfurization, wherein the partially desulfurized product of the first step is subjected to a shift reaction over sulfur-resistant shift catalyst and under conditions effecting hydrolysis of COS to $H_2S$ and $CO_2$. The $H_2S$ content of the shift product gas is absorbed in the second stage desulfurization step and the resulting rich solvent is recycled for use in the first desulfurization stage. Because the desulfurization solvent is used twice, operating costs are minimized and a desirable Claus feed of high $H_2S$ concentration is obtained.

DETAILED DESCRIPTION

Figure 1:
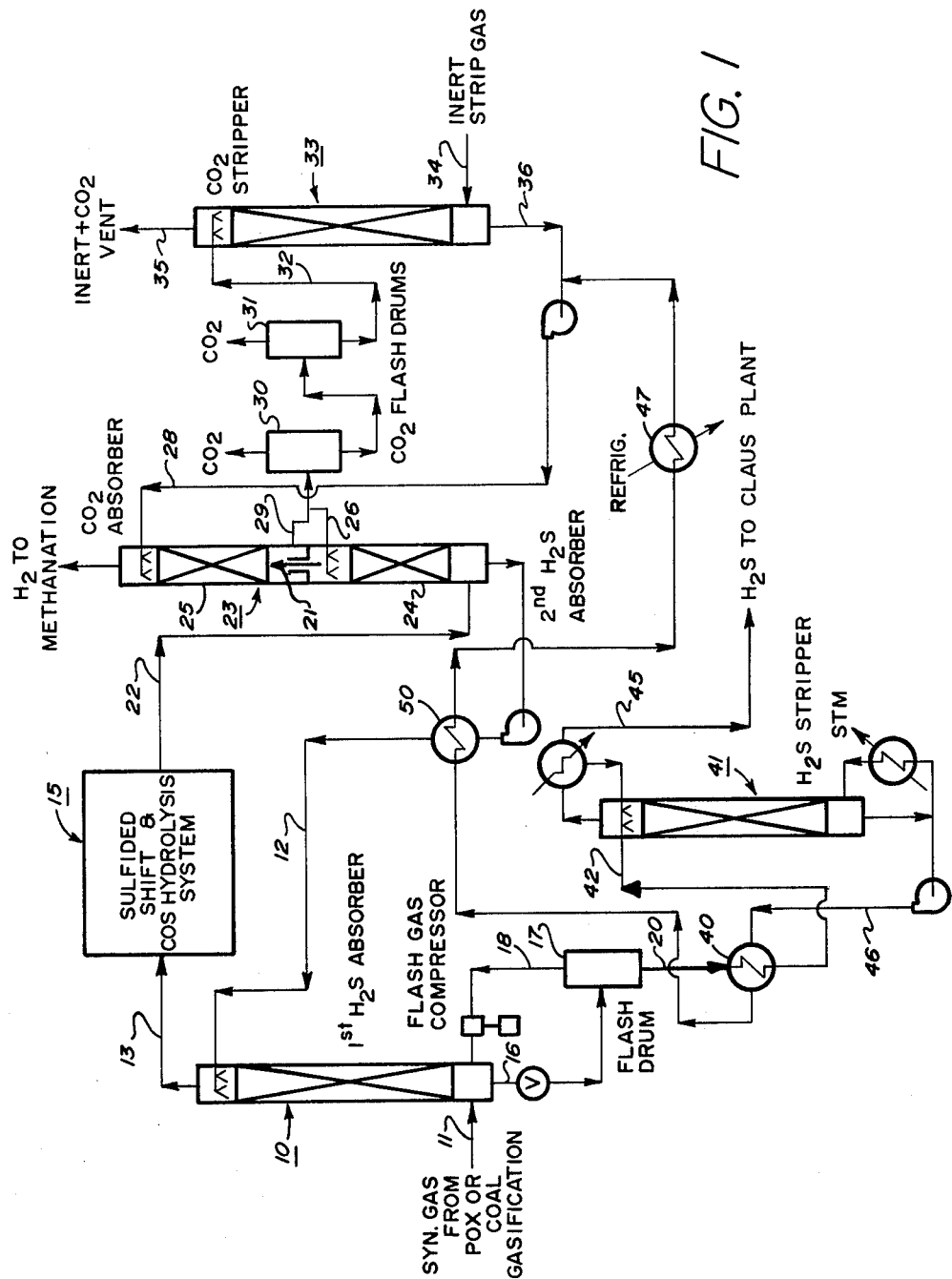
FIG. 1 is a simplified flow diagram of a process scheme according to the invention.

For ready appreciation of the principal differences in the process of the present invention over the processes heretofore proposed or employed, reference is directed to FIG. 1 wherein the new process is illustrated by a simplified flow diagram. The feed gas, although not limited thereto, is a gaseous mixture having the composition such as that obtained by partial oxidation of heavy petroleum oil or by gasification of coal by known processes. Such gas mixture will contain as principal components (by volume) hydrogen, carbon monoxide, carbon dioxide and lesser quantities of methane, hydrogen sulfide and carbonyl sulfide. The feed gas mixture is introduced into the bottom of a first $H_2S$ absorption column 10 by line 11, wherein it is contacted with suitable solvent introduced into the top section of the column by line 12.

The overhead effluent from absorption column 10, comprising the partially desulfurized gas mixture is withdrawn by line 13 and sent to catalytic shift converter 15. The rich solvent leaving the bottom of column 10 by line 16 goes to a flash drum 17. The flashed vapors are withdrawn through line 18 and, after being compressed to the employed operating pressure, are returned to the bottom part of column 10. This flash recompression is to recover valuable coabsorbed $H_2$ and CO. The unvaporized liquid from flash drum 17 is withdrawn through line 20.

In the first stage of desulfurization in column 10, the major fraction of the original $H_2S$ content of the feed gas will have been removed but only up to about 65% of the original COS. Thus, the partially purified gas mixture introduced into shift converter 15 will contain the remaining COS as well as some of the $H_2S$ entering column 1 with the recycled solvent introduced by line 12, as will hereinafter appear. Accordingly, the shift catalyst employed in converter 15 is one that is sulfur resistant.

The shift reaction in converter 15 is carried out at outlet temperatures in the shift converter reactor in the range of 370 to 170° C., and under conditions such that up to 98% or more of the CO is converted to $CO_2$ while practically all of the COS (99+%) is hydrolyzed to $CO_2$ and $H_2S$.

The products leaving converter system 15 are introduced by line 22 into a second $H_2S$ absorber. The second $H_2S$ absorber may be the lower section 24 of an integrated column 23, having an upper $CO_2$ absorption section 25 as shown in FIG. 1 or these sections may be separate vessels as will hereinafter appear. In the second $H_2S$ absorber 24 the gas mixture introduced therein by line 22, is contacted with essentially sulfur free, $CO_2$ preloaded solvent admitted at the top of column 24 by line 26 and the sulfur, now essentially all as $H_2S$, is substantially completely removed. In accordance with known absorbtion principles as described in Chapter VI of "Absorbtion and Extraction" by T. K. Sherwood and R. L. Pigford, McGraw-Hill Book Company, 1952, the solvent flow, stream 26, is set to give an $H_2S$ absorbtion factor, $A_{H\,S}$ greater than unity to achieve essentially complete $H_2S$ absorbtion with an appropriate number of countercurrent equilibrium contacting trays as calculated by the equation $$\frac{Y_{N+1} - Y_1}{Y_{N+1} - K_o x_o} = \frac{A_{H2S}^{N+1} - A_{H2S}}{A_{H2S}^{N+1} - 1}$$

where

N = number of equilibrium trays in the $H_2S$ absorber column 24

$Y_{N+1}$ = mole fraction of $H_2S$ in the column feed, stream 22

$Y_1$ = mole fraction of $H_2S$ in the column overhead gas, stream 21

$x_o$ = mole of fraction of $H_2S$ in the lean solvent, stream 26

$K_o = Y_o/x_o$ = vapor liquid equilibrium constant for $H_2S$ in stream 26

$A_{H2S} = L/K_{H2S}V = H_2S$ absorbtion factor where

L = total moles of $CO_2$ preloaded solvent, stream 26

V = total moles of treated gas, stream 21

K = the average $H_2S$ vapor liquid equilibrium constant in column 24

To achieve substantially complete removal of $H_2S$ with a reasonable number of equilibrium stages and a reasonable solvent rate, $A_{H2S}$ would typically be set in the range of 1.1 to 1.8. In the application as shown in FIG. 1, where $CO_2$ preloaded solvent is used, the absorber temperature is substantially constant from top to bottom and $K_{H2S}$, L and V and therefore $A_{H2S}$ are roughly constant for all stages.

The rich solvent from the bottom of absorber 24 is heated about 50° F. in heat exchanger 50 preferably by regenerated solvent from heat exchanger 40. This heat exchange serves to cool the regenerated solvent and to vaporize the bulk of the coabsorbed $CO_2$ in stream 12 so that it is stripped overhead in the first $H_2S$ absorber 10 and recycled through the shift section 15. In column 10, as the bulk of the $H_2S$ in feed stream 11 is absorbed, the bulk of the $CO_2$ in the solvent stream 12 is stripped. The $CO_2$ content of the bottom solvent stream 16 is essentially in equilibrium with the $CO_2$ content of the feed stream 11.

The gaseous overhead effluent from absorber 24 is passed into the $CO_2$ absorbent section 25, in which it is contacted with solvent admitted to the top of 25 by line 28. The rich solvent collected at the bottom of section 25 is withdrawn by line 29, a portion of the liquid in line 29 being sent to the upper part of section 24 via line 26, as earlier stated.

The remaining liquid solvent in line 29 is treated to remove contained $CO_2$. Thus, the rich solvent in line 29 may be flashed in one or more stages or subjected to other known means for $CO_2$ removal therefrom. As illustrated in FIG. 1, the rich solvent portion in line 29 is flashed in drums 30, 31, and the unvaporized liquid passed to a $CO_2$ stripper for removing residual $CO_2$. As shown, the liquid is introduced by line 32 into the top part of $CO_2$ stripper 33 and contacted with upwardly flowing stripping gas from line 34 entering the bottom part of 33. The stripping gas and stripped $CO_2$ are vented by line 35. The stripped liquid solvent is withdrawn from the stripper by line 36.

The portion of the rich solvent from the first $H_2S$ absorber 10 flowing through line 20 is heated by exchange, as indicated at 40 and sent to $H_2S$ stripper 41, being introduced into the upper part of the stripper by line 42. The $H_2S$ effluent stream withdrawn by line 45 will be sufficiently concentrated in sulfur values for direct introduction into a conventional Claus plant for recovery of sulfur.

The lean solvent withdrawn at the bottom of column 41 by line 46, is cooled as indicated at 40, 50 and 47 and is introduced into line 28, together with the recovered solvent in line 37 coming from the $CO_2$ stripper 33.

The absorber and stripper columns employed in the system of the present invention as well as the auxiliary equipment may be generally of the types conventionally employed for such respective purposes. Likewise, a conventional shift converter may be utilized. Since the gas introduced into the shift reactor contains sulfur, the shift catalyst must be sulfur tolerant and the internals of the converter should be provided with sulfur resistant clading such as stainless steel, and similarly the heat exchanger tubes and interconnecting piping should be of such sulfur resistant material.

The limits and preferred operating ranges for practice of the several operations of the invention vary with the particular solvent employed. The temperature for the $H_2S$ absorption steps may thus range from minus 60° F. ($-51°$ C.) to 130° F. ($-54°$ C.) at pressures in the range of about 15 to 150 atmospheres. Because solubility typically increases as temperature is decreased, lower temperatures and even refrigerated temperatures are preferred, to maximize loading and minimize solvent circulation rate. Minimum temperatures are set by the solvent freezing point coupled with the cooling that occurs on desorption or stripping with inert gas. Also, the selected temperature should not be so low that the viscosity of the liquid becomes high enough to cause a disproportionate loss in mass transfer efficiency. On the other hand, one should avoid high temperatures at which solvent losses from volatility become an important deciding factor. In hot stripping of solvent, the temperature must be maintained below that at which thermal decomposition of the solvent would occur. With more volatile solvents the stripping temperature selected needs to take into consideration expected evaporation losses or suitable means have to be added to recover vaporized solvent losses.

For most efficient operation of the process in accordance with the present invention and obtaining all of its advantages, the solvent employed in absorption of $H_2S$ should be one in which $H_2S$ is more soluble than is $CO_2$ and the solubility of COS therein is intermediate that of $H_2S$ and $CO_2$. Among examples of such solvents are included: methanol, propylene carbonate, N-methyl-2-pyrrolidone, and dimethyl ether of ethylene glycol.

Although in certain of the known systems air may be employed in the $CO_2$ stripper, it is best to employ nitrogen or other inert gas in stripper 33, since the solvent introduced therein contains some sulfur.

If the water content of the gas entering shift converter section 15 is insufficient, steam is added thereto to provide a steam to dry gas ratio in the order of about 1.5:1. Any of the known sulfur-resistant shift catalysts may be employed for the CO conversion and COS hydrolysis. Included among such catalysts are chromium promoted iron oxide, cobalt moly on alumina or on spinnel. Also, the process conditions to be employed for the CO shift are those generally employed in shift operations, such as are described in Gas Making and Natural Gas, by BP Trading Limited, London, 1972, at pages 158 through 163.

Figure 2:
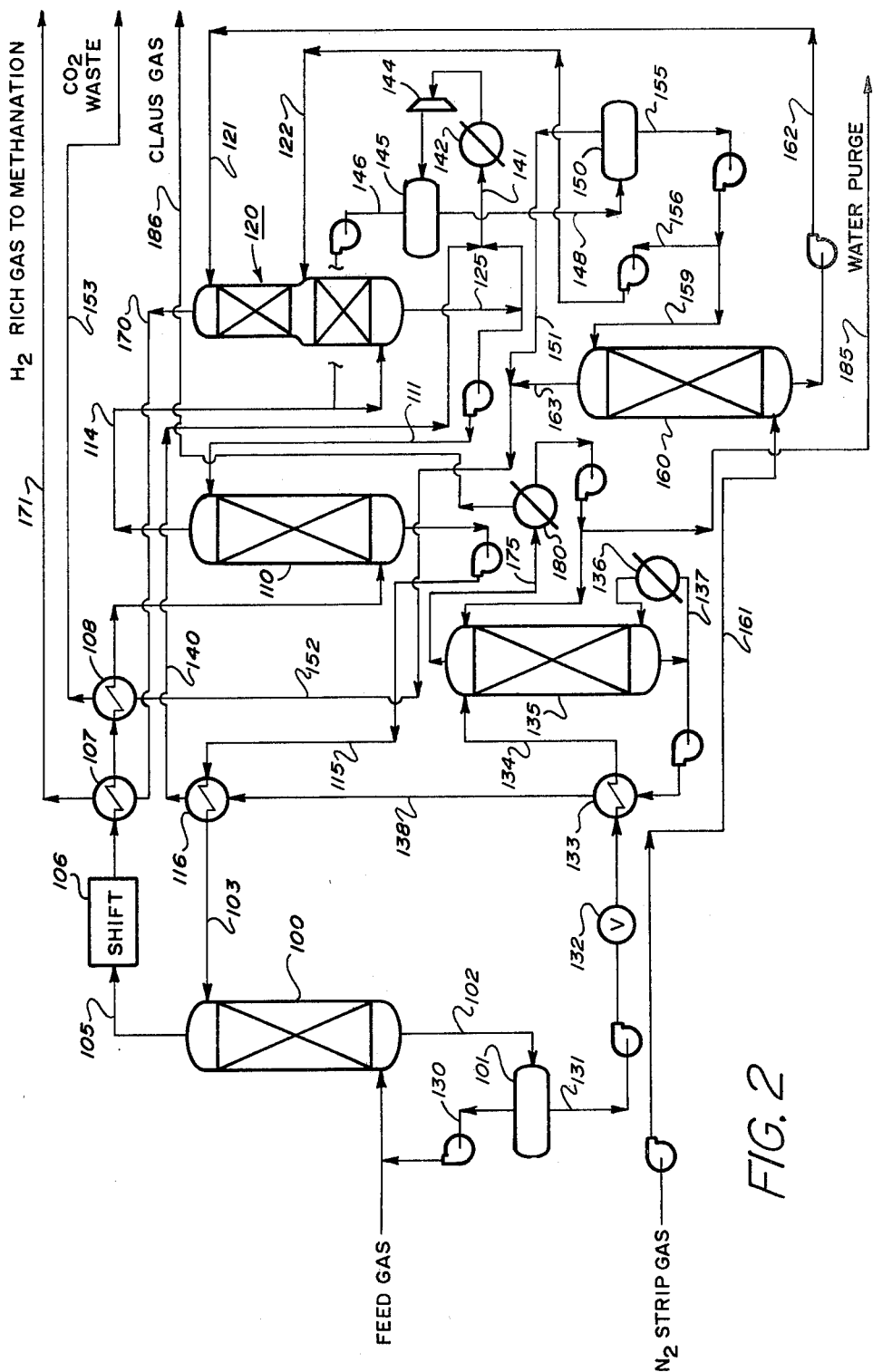
FIG. 2 is a more detailed process flow diagram illustrating a system for practical operation in practice of the invention.

FIG. 2 illustrates in detail a preferred system that may be employed in practice of the invention. The operation of such system is hereinafter described as applied, in a preferred practice to a plant designed to process about 720 English tons per day (655 metric tons/day) of a sulfur and $CO_2$-containing gas mixture with n-methyl-2-pyrrolidone absorbent solvent. The gas feed in this example is one comprised of:

|  | mole % |
|---|---|
| Hydrogen | 43.4 |
| Carbon monoxide | 47.6 |
| Carbon dioxide | 6.4 |
| Methane | 0.52 |
| Hydrogen sulfide | 0.85 |
| Carbonyl sulfide | 0.04 |
| Water | 0.22 |
| Nitrogen | 0.18 |
| Argon | 0.73 |

The feed gas is introduced into the first $H_2S$ absorber 100 at a pressure of about 674 psia ($\sim$46 atmospheres) and at 110° F. ($\sim$43° C.). The fresh feed flow rate is designed at about 3400 LB. moles gas per hour, to which there is added a small amount of gas recovered by flashing in drum 101 of the rich solvent withdrawn from absorber 100 by line 102. The solvent stream is introduced at 100° F. ($\sim$38° C.) into absorber 100 by line 103 at a rate to provide 1180 lb. moles/hr. (536 kg moles/hr.) solvent (N-methyl-2-pyrrolidone). The stream contains in addition to the organic solvent, carbon dioxide (28.2 mol %) and water (15.5 mole %). The gaseous effluent discharged from absorber 100 through line 105 will contain among other components:

|  | mole % |
|---|---|
| Hydrogen | 37.9 |
| Carbon Monoxide | 41.4 |
| Carbon dioxide | 19.4 |
| Methane | 0.5 |
| Hydrogen sulfide | 0.1 |
| Carbonyl sulfide | 0.02 |

The CO shift in converter 106 is carried out at those conditions of temperature and pressure to obtain maximum utilization of the sulfur resistant shift catalyst. One preferred catalyst is marketed as an Exxon Topsoe SSK catalyst. Utilization of this catalyst is described in a paper entitled "Sulfur Tolerant Shift Process and Catalyst", presented by Ib Dybkjaer, Hans Bohlbro, C. L. Aldredge and K. L. Riley at the November, 1978 meeting of the American Institute of Chemical Engineers held in Miami, Fla.

The treated gas from absorber 100 is heated and combined with steam in the shift conversion system 106 so that, after shift and COS hydrolysis are completed and the stream is cooled to condense excess steam it has the following composition:

|  | mole % |
|---|---|
| Hydrogen | 55.8 |
| Carbon monoxide | 0.6 |

-continued

| | mole % |
|---|---|
| Carbon dioxide | 41.0 |
| Methane | 0.3 |
| Hydrogen sulfide | 0.1 |
| Carbonyl sulfide | nil |

The gas products leaving the shift conversion system 106 (which would typically include a cooler saturation system with the shift reactors) at about 100° F. ($\sim$38° C.) are cooled to about 60° F. ($\sim$16° C.) in exchanger 107 and further cooled to 50° F. ($\sim$10° C.) in exchanger 108, then introduced into the bottom of the second $H_2S$ absorber 110. The treating solvent stream, introduced into the upper part of absorber 110 through line 111, is not significantly different in composition from that entering the upper part of absorber 100, but such stream will be of lower temperature (about 50° F.= $\sim$10° C.) and is essentially sulfur free. The solvent flow is set to give an absorption factor of 1.3 with sufficient countercurrent equilibrium contacting stages to obtain substantially complete $H_2S$ absorption. This fixes the N-methyl-2-pyrrolidone flow at the forementioned rate of 1180 lb. moles/hr. (536 kg moles/hr.)

The overhead desulfurized effluent leaving column 110 by line 114 will comprise principally hydrogen and $CO_2$ and will be essentially free of sulfur. The recovered rich liquid bottoms withdrawn by line 115 will contain dissolved $H_2S$. The liquid in line 115 is heated by exchange at 116 and returned to the top of column 100 by line 103. The gaseous effluent in line 114 is passed to the bottom part of a split column 120 for removal of $CO_2$ by solvent absorption. The solvent for such $CO_2$ removal is admitted to the upper part of column 120 by line 121. The solvent here employed is the same as that used in the desulfurization columns, the source of which will hereinafter be described. The solvent in line 121 is essentially free of $H_2$, CO and $CO_2$. Additional solvent is admitted intermediate the upper and lower sections of column 120 by line 122. The solvent in line 122 will contain dissolved $CO_2$ (up to about 10 mole %). To obtain desired high absorption of $CO_2$, the solvent is desirably admitted to column 120 at sub-ambient temperature, preferably at about 10° F. ($\sim$ $-$12° C.).

The rich liquid solvent is withdrawn from the bottom of column 120 by line 125 and split into a minor portion (about 15 mole %), which is passed to column 110 via line 111, while the other portion is chilled and expanded and further treated as will be described hereinafter.

The rich solvent withdrawn from the first $H_2S$ absorber through line 102 after flashing in drum 101, provides a gas phase discharged by line 130 and a liquid phase withdrawn through line 131. The gas product in line 130 is compressed to operating pressure and recycled to join the fresh feed entering the bottom of absorber 100 to recover $H_2$ and CO dissolved in 102. The liquid in line 131 is expanded at 132, heated by exchange at 133 and introduced by line 134 into the upper part of $H_2S$ stripper 135. The stripped liquid, consisting almost entirely of organic solvent and water, is discharged at the bottom of stripper 135, a portion being returned through reboiler 136 and the rest being repressured in line 137 and thereby pumped through heat exchanger 133 into line 138. As the result of heat exchange at 133, the liquid is cooled by about 200° F. ($\sim$110° C.) and passed by line 138 through heat exchanger 116 wherein it is further cooled by exchange with the liquid being passed from line 115 into line 103. As a result of such exchange, the liquid in line 138 is cooled to about 65°–75° F. ($\sim$18°–24° C.) while the liquid entering $H_2S$ absorber 100 through line 103 is warmed to about 100° F. ($\sim$38° C.).

The liquid from line 138, after cooling in exchanger 116, is sent by line 140 to join the major portion of the liquid discharged from the $CO_2$ absorber 120 that is to be chilled and expanded as earlier indicated. The liquids from line 140 and the portion from line 125 are combined in line 141 and passed through a solvent chiller 142 wherein they are cooled to about 34° F. ($\sim$1° C.). The chilled liquid stream, containing dissolved $CO_2$, is expanded at 144 to a pressure of about 20 atmospheres and subjected to liquid-vapor separation by flashing in drum 145. The vaporized portion leaves drum 145 by line 146 and is recycled to join the gas products in line 114 being sent to $CO_2$ absorber column 120 to receive flashed $H_2$.

The liquid product discharged from drum 145 is passed by line 158 into another flash drum 150 for further liquid-vapor separation at just above ambient pressure. The vapor product stream discharged from drum 150, consisting almost entirely of $CO_2$, is vented by lines 151, 152 and 153, passing enroute through heat exchanger 108 wherein it serves to cool the products being passed from shift conversion to the second $H_2S$ absorber 110.

The liquid product discharged from drum 150 by line 155 is composed of semi-rich liquid solvent containing dissolved $CO_2$ (about 3 mole %). A portion of this semi-rich liquid solvent is introduced into the intermediate portion of $CO_2$ absorber 120 via lines 156 and 122, while the remainder is introduced into the upper portion of $CO_2$ stripper 160 by line 159. Stripping is effected in 160 by introducing into the bottom thereof an inert gas, such as nitrogen, by line 161. The stripped lean solvent discharged from 160 through line 162 is pumped into line 121 to provide the absorbent solvent introduced into the upper part of $CO_2$ absorber 120. The stripped $CO_2$, together with the inert stripping gas, is discharged from the top of 160 by line 163 and joins the gas products being passed from line 151 into line 152, to be vented through line 153.

The unabsorbed gas products withdrawn as overhead effluent from $CO_2$ absorber 120 by line 170 are heat exchanged at 107 to cool the products of the shift conversion, and then sent to methanation or other desired disposition via line 171. The hydrogen-rich product gas in line 171 will contain over 95 to 97 or more mole % hydrogen and a total of no more than about 2% oxides of carbon, which is chiefly CO oxides of carbon, which is chiefly CO, and will be essentially free of sulfur.

The stripped vapor products withdrawn overhead by line 175 from $H_2S$ stripper 135 are partially condensed at 180, a part of the condensed liquid portion being returned as reflux to the upper portion of 135, and the remainder discharged as waste through line 185, being composed largely of water containing a minor amount of organic solvent. The uncondensed vapor portion from 180 withdrawn through line 186, is sent to a conventional Claus unit for recovery of sulfur values. The vapor product sent to the Claus unit will contain about 35 mole % of sulfur gas, chiefly $H_2S$, and will be substantially free of the organic solvent employed in desulfurization.

Solvent for the initial start-up and for make up of solvent losses in operation, may be introduced under suitable control into the second $H_2S$ absorber, for example by introducing such solvent into line 111.

What is claimed:

1. In the process of desulfurizing, shifting and decarbonizing a contaminated synthesis gas stream, obtained by gasification of coal or heavy hydrocarbon oil, to obtain a purified hydrogen rich stream, said synthesis gas stream containing among contaminants therein $H_2S$, COS, CO and $CO_2$; the improvement which comprises: effecting such desulfurizing with organic solvent in two physical absorption stages, wherein said synthesis gas stream in the first absorption stage is contacted with organic liquid solvent under conditions effecting physical absorption therein of the major portion of the $H_2S$ in said stream but not more than up to about 65% of the COS; introducing the gaseous effluent from the first absorption stage containing unremoved COS to shift reaction with water over sulfide-resistant shift catalyst to convert CO therein to $CO_2$ and hydrogen, while hydrolyzing the COS therein to form $H_2S$; subjecting the products of said shift reaction to the second absorption stage for removal of essentially all of the contained residual sulfide gases therefrom by physical absorption in an organic solvent; and utilizing the rich sulfide-containing solvent from said second absorption stage for said contacting of the synthesis gas stream in the first absorption stage.

2. The improvement as defined in claim 1 wherein the second stage desulfurization is effected at a pressure in the range of 15 to 150 atmospheres and at a temperature of $-60°$ to $130°$ F., employing sufficient physical absorbent liquid to obtain an absorption factor in the range of 1.1 to 2.0 in the second absorption stage.

3. The improvement as defined in claim 2 wherein the first stage desulfurization is effected at a pressure in the range of 15 to 150 atmospheres and at a temperature of $-60°$ to $130°$ F., employing as absorbent liquid the bottoms liquid from the second stage desulfurization.

4. The improvement as defined in claim 3 wherein the solvent employed in both desulfurization stages is one in which $H_2S$ is more soluble than is $CO_2$ and in which COS has a solubility intermediate that of $H_2S$ and $CO_2$.

5. The improvement as defined in claim 3 wherein N-methyl-2-pyrrolidone is employed as the organic solvent in said first and second absorption stages.

6. The improvement as defined in claim 3 wherein dimethyl ethers of polyethylene glycol is employed as the organic solvent in said first and second absorption stages.

7. The improvement as defined in claim 3 wherein methanol is employed as the organic solvent in said first and second absorption stages.

8. The improvement as defined in claim 3 wherein propylene carbonate is employed as the organic solvent in said first and second absorption stages.

9. The method of removing from a hydrogen gas feed stream $CO_2$ and gaseous sulfides including $H_2S$ and COS therein contained which comprises the steps of (a) subjecting such stream to physical absorption by an organic liquid solvent for gaseous sulfides under conditions effective to remove at least the bulk of the $H_2S$ and only part of the COS therein;

(b) subjecting the thus partially desulfurized gas to a gas shift reaction with water over sulfur-resistant shift catalyst to convert CO therein to $CO_2$ while hydrolyzing the COS to form $CO_2$ and $H_2S$;

(c) cooling the gaseous products obtained from step (b) and subjecting the same to a second physical absorption by organic liquid solvent for gaseous sulfides to remove essentially all of the residual gaseous sulfides therefrom; and returning the rich solvent liquid containing said removed residual sulfides for use in step (a);

(d) withdrawing the desulfurized gas effluent from step (c) and subjecting the same to contact with liquid organic solvent at sub-ambient temperatures to remove $CO_2$ therefrom and recovering a purified hydrogen-rich stream essentially free of gaseous sulfides;

(e) withdrawing the rich solvent containing dissolved $CO_2$ from step (d) and utilizing a minor portion thereof as the solvent for removal of gaseous sulfides in step (c);

(f) flashing and/or stripping $CO_2$ from the major portion of the rich solvent from step (e) and utilizing the stripped solvent as part of the liquid solvent for absorption of $CO_2$ in step (d);

(g) stripping $H_2S$ from the rich solvent liquor recovered in step (a) to obtain a gaseous effluent of sufficiently high sulfide content enabling recovery of sulfur values therefrom in conventional Claus operation; and (h) utilizing at least part of the stripped lean solvent from step (g) for another part of liquid organic solvent for absorption of $CO_2$ in step (d).

10. The method as defined in claim 9 wherein said organic liquid solvent used in steps (a) and (c) is one having a higher solvent capacity for $H_2S$ than for $CO_2$ and a solvent capacity for COS which is intermediate that $H_2S$ and $CO_2$.

11. The method as defined in claim 9 wherein said hydrogen gas feed stream subject to purification is one containing initially substantially equal volumes of hydrogen and carbon monoxide.

12. The method as defined in claim 9 wherein said hydrogen gas feed stream subjected to purification contains by volume an amount of carbon oxide gases in excess of the hydrogen content thereof.

13. The method as defined in claim 12 wherein said hydrogen gas feed stream is one containing less than 1.5 mol % gaseous sulfides.

14. The method as defined in claim 9 wherein the shift converted product subjected to desulfurization in step (d) contains over 20 mol % carbon dioxide and less than one-half mole % of sulfide gases.

15. The method as defined in claim 9 wherein the organic liquid solvent employed in defined desulfurization is N-methyl-2-pyrrolidone.

16. The method as defined in claim 9 wherein the absorption in step (a) is effected at a solvent inlet temperature of about 100° F.

17. The method as defined in claim 9 wherein the second absorption in step (c) is effected at a solvent inlet temperature of about 50° F.

18. The method as defined in claim 9 wherein the solvent liquid returned from step (c) for use in step (a) contains dissolved $CO_2$ and is heated before its use in step (a) to vaporize at least a major portion of the dissolved $CO_2$.

19. The method as defined in claim 9 wherein said sub-ambient temperature of step (d) is below 100° F.

20. The method as defined in claim 9 wherein stripping of $CO_2$ in step (f) is effected by passing an inert gas through the rich solvent from step (e).

21. The method as defined in claim 9 wherein the stripping of $H_2S$ from the rich solvent from step (a) is effected by vaporization.

22. The method as defined in claim 18 wherein the gaseous effluent obtained in step (g) has a minimum content of sulfide gases in excess of 20%.

* * * * *